United States Patent
Miao et al.

(10) Patent No.: US 7,626,439 B2
(45) Date of Patent: Dec. 1, 2009

(54) CROSS-POINT ADJUSTMENT CIRCUIT

(75) Inventors: Jason Y. Miao, San Jose, CA (US);
Timothy G. Moran, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/736,263

(22) Filed: May 21, 2007

(65) Prior Publication Data
US 2008/0079484 A1   Apr. 3, 2008

Related U.S. Application Data (60) Provisional application No. 60/827,239, filed on Sep. 28, 2006.

(51) Int. Cl.
*H03K 5/08* (2006.01)

(52) U.S. Cl. .......................... 327/309; 327/79

(58) Field of Classification Search ............... 327/79, 327/306–309, 311, 312, 551, 553
See application file for complete search history.

(56) References Cited

U.S. PATENT DOCUMENTS

| | | | | |
|---|---|---|---|---|
| 4,577,336 | A * | 3/1986 | Kriedt et al. | 377/111 |
| 5,682,120 | A * | 10/1997 | Ito | 330/252 |
| 6,316,992 | B1 * | 11/2001 | Miao et al. | 330/2 |
| 6,335,655 | B1 * | 1/2002 | Yamamoto | 327/552 |
| 6,388,519 | B1 * | 5/2002 | Tachimori | 330/253 |
| 6,507,241 | B1 * | 1/2003 | Ritter | 330/9 |
| 6,528,777 | B2 * | 3/2003 | Ames et al. | 250/214 R |
| 6,583,662 | B1 * | 6/2003 | Lim | 327/553 |
| 6,724,248 | B2 * | 4/2004 | Llewellyn | 330/9 |
| 6,856,195 | B2 * | 2/2005 | Ranmuthu | 330/86 |
| 6,914,479 | B1 * | 7/2005 | Gabillard et al. | 330/69 |
| 6,930,549 | B2 * | 8/2005 | Kajiwara et al. | 330/254 |
| 7,352,307 | B2 * | 4/2008 | Iorgulescu | 341/118 |
| 2004/0028099 | A1 * | 2/2004 | Hongo et al. | 372/38.02 |
| 2005/0133691 | A1 * | 6/2005 | Doppke et al. | 250/214 A |

* cited by examiner

*Primary Examiner*—Lincoln Donovan
*Assistant Examiner*—Thomas J Hiltunen
(74) *Attorney, Agent, or Firm*—Workman Nydegger (57) ABSTRACT

An amplifier stage or circuit for providing cross-point adjustment. The circuit may include a first input node configured to receive a first data signal and a second input node configured to receive a second data signal that is complementary of the first data signal. The circuit also includes a programmable first stage having a first node coupled to the first input node and a second node coupled to the second input node that is configured to adjust an amount of current provided to the first and second data signals to create a signal offset. The circuit further includes a second stage having a first node coupled to a third node of the programmable first stage and a second node coupled to a fourth node of the programmable first stage configured to provide the signal offset at a third and fourth node of the second stage to adjust the cross-point of the first and second signals.

19 Claims, 6 Drawing Sheets

CROSS-POINT ADJUSTMENT CIRCUIT

CROSS-REFERENCE TO RELATED APPLICATIONS

This application claims the benefit of U.S. Provisional Application No. 60/827,239, filed Sep. 28, 2006, which is incorporated herein by reference in its entirety.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "controller") controls the operation of the laser driver and post-amplifier.

During the operation of an optical transceiver, it is often important to evaluate the quality of a received data signal. One tool often used to help in the evaluation process is an eye diagram or pattern. As is well known, an eye diagram is formed by superimposing a long stream of random bits on one another on an oscilloscope or like device. The bit streams include the transitions from high to low and low to high. Several system performance measures can be derived by analyzing the eye diagram. For example, if the signals are too long, too short, poorly synchronized with the system clock, too high, too low, too noisy, too slow to change, or have too much undershoot or overshoot, this can be observed from the eye diagram. In particular, an open eye diagram corresponds to minimal signal distortion.

The eye diagram may also be used to observe the cross-point. The cross-point is the point on the eye diagram where the transitions from high to low and low to high occur. For example, a digital low is often represented by a 0 volt signal and a digital high is represented by a 1 volt signal. Accordingly, in an ideal system, the cross-point would be observed at 0.5 volts.

One important task performed by the post-amplifier is to determine if the bits of the received data signal represent a digital 0 (low) or a digital 1 (high). In order to perform such a task, circuitry in the post-amplifier reads the received data signal and makes the determination. In an ideal system with a cross-point at 0.5 volts, any signal of 0.49 volts and below would typically be determined to be a low and any signal of 0.51 volts or higher would typically be determined to be a high. However, it is the often case that noise and other signal offsets caused by fiber impurities, transistor mismatch, and the like cause distortion in the received signals. For example, added noise may cause a signal to be incorrectly determined as a high signal. It would therefore be advantageous to have the ability to adjust the cross-point of the received signals up or down (i.e., higher or lower than 0.5 volts) to help compensate for any signal impurities.

BRIEF SUMMARY

Embodiments disclosed herein relate to an amplifier stage or circuit for providing cross-point adjustment. The circuit may include a first input node configured to receive a first data signal and a second input node configured to receive a second data signal that is complementary of the first data signal.

The circuit also includes a programmable first stage having a first node coupled to the first input node and a second node coupled to the second input node. The programmable first stage is configured to adjust an amount of current provided to the first and second data signals to create a signal offset.

The circuit further includes a second stage having a first node coupled to a third node of the programmable first stage and a second node coupled to a fourth node of the programmable first stage. The second stage is configured to provide the signal offset at a third and fourth node of the second stage to adjust the cross-point of the first and second signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to an amplifier stage or circuit for providing cross-point adjustment. The circuit may include a first input node configured to receive a first data signal and a second input node configured to receive a second data signal that is complementary of the first data signal.

The circuit also includes a programmable first stage having a first node coupled to the first input node and a second node coupled to the second input node. The programmable first stage is configured to adjust an amount of current provided to the first and second data signals to create a signal offset.

The circuit further includes a second stage having a first node coupled to a third node of the programmable first stage and a second node coupled to a fourth node of the programmable first stage. The second stage is configured to provide the signal offset at a third and fourth node of the second stage to adjust the cross-point of the first and second signals.

I. Operating Environment

Figure 1:
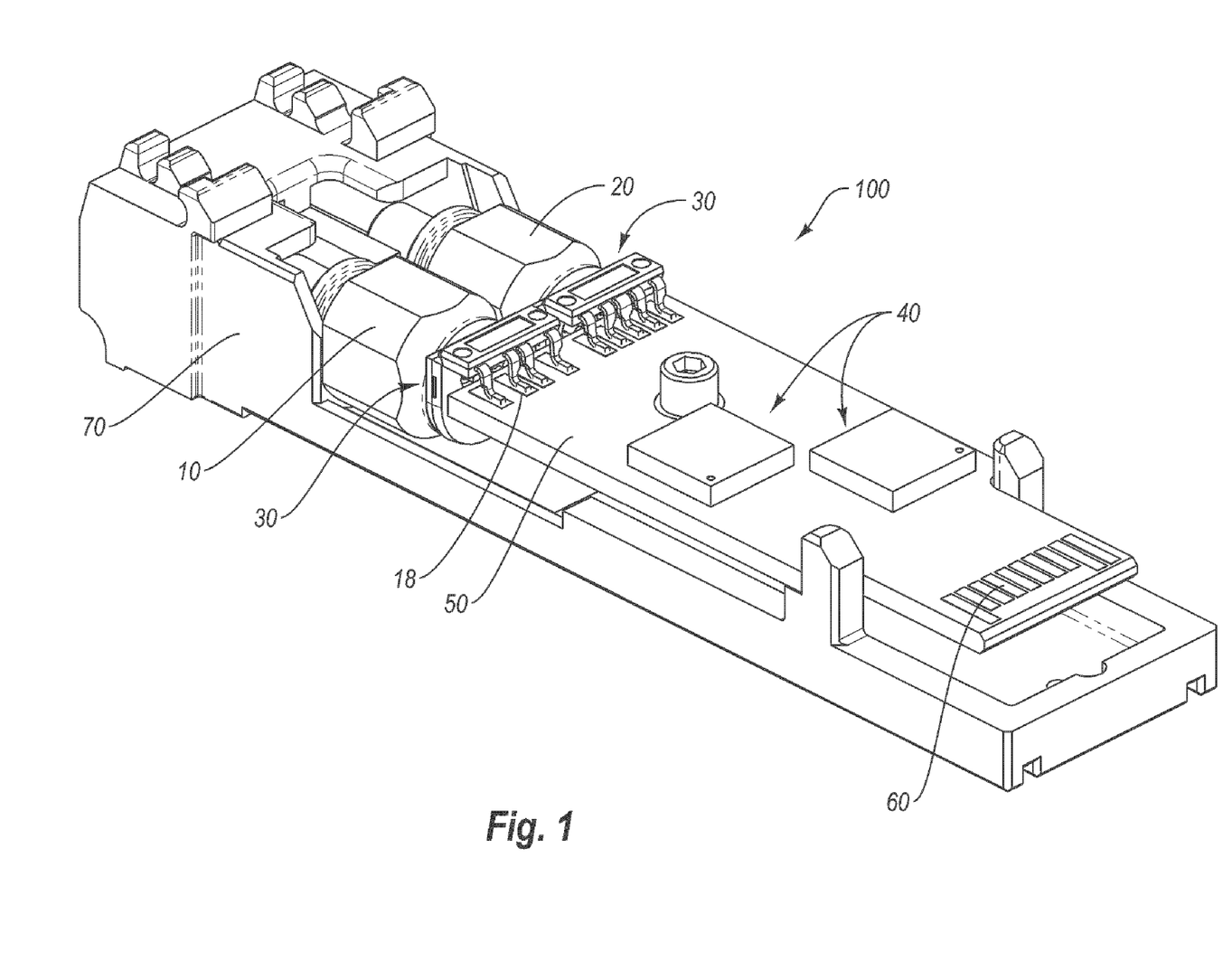
FIG. 1 is a perspective view of an example of an optical transceiver module.

Reference is first made to FIG. 1, which depicts a perspective view of an example optical transceiver module ("transceiver"), generally designated at 100, for use in transmitting and receiving optical signals in connection with an external host that is operatively connected, in one embodiment, to a communications network. As shown, the transceiver shown in FIG. 1 includes various components, including a Receiver Optical Subassembly ("ROSA") 10, a Transmitter Optical Subassembly ("TOSA") 20, electrical interfaces 30, various electronic components 40, such as a laser-driver/post-amplifier and a control module for example, and a printed circuit board 50 which supports the electronic components 40.

In the illustrated embodiment, two electrical interfaces 30 are included in the transceiver 100, one each used to electrically connect the ROSA 10 and the TOSA 20 to a plurality of conductive pads located on the PCB 50. The electronic components 40 are also attached to the PCB 50. An edge connector 60 is located on an end of the PCB 50 to enable the transceiver 100 to electrically and mechanically interface with a host (not shown). In addition, the above-mentioned components of the transceiver 100 are partially housed within a housing 70. Though not shown, some embodiments include a shell that cooperates with the housing 70 to define an enclosure for components of the transceiver 100.

Figure 2:
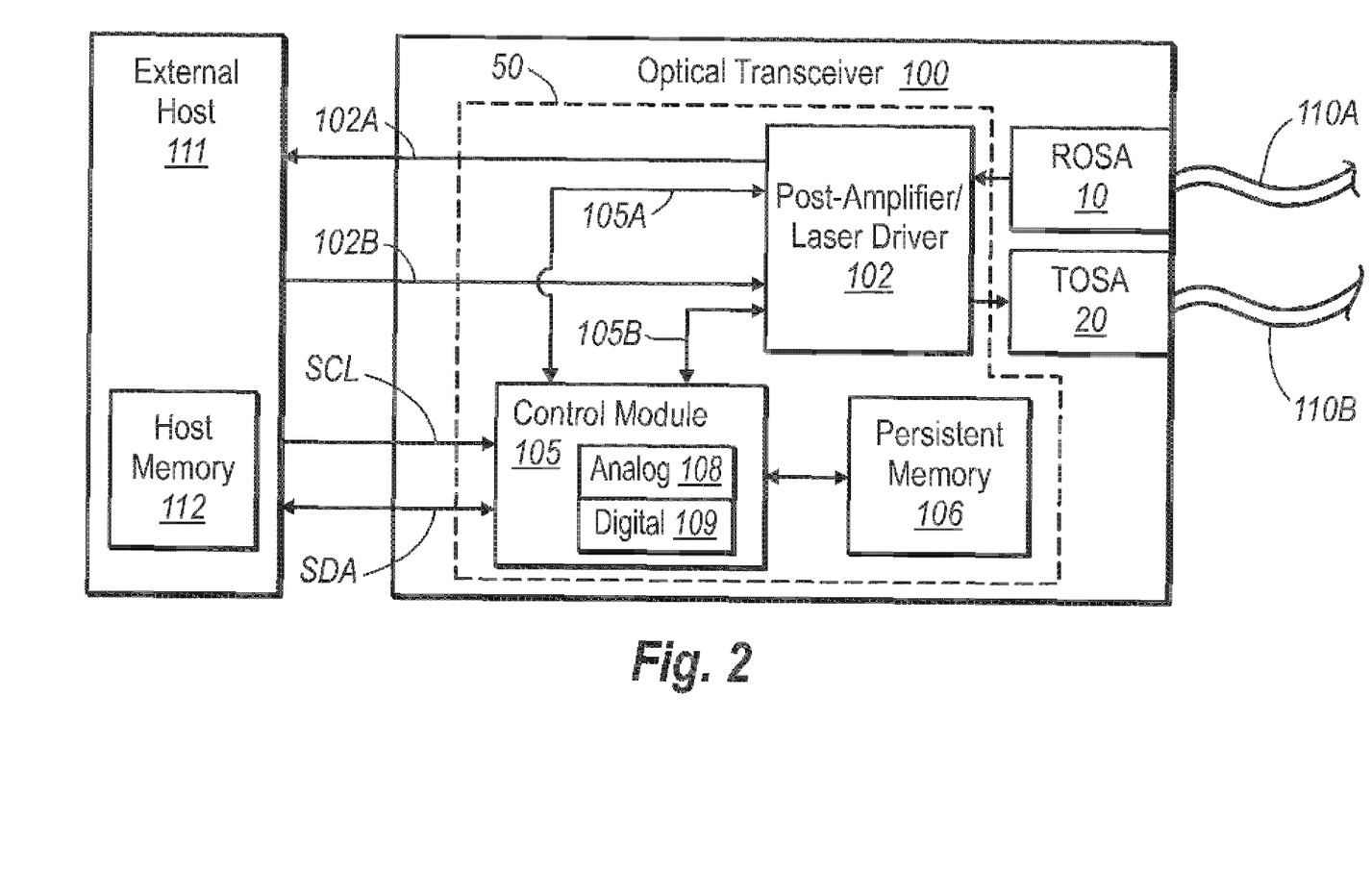
FIG. 2 is a simplified block view showing various aspects of the optical transceiver module of FIG. 1.

Reference is now made to FIG. 2, which is a simplified block diagram of an example of an optical transceiver, denoted at 100 in FIG. 1, depicting various physical and operational aspects of the transceiver. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including 1 Gbit/s, 2 Gbit/s, 4 Gbit/s, 8 Gbit/s 10 Gbit/s, as well as even higher data rates. Furthermore, the embodiments described herein can be implemented in optical transceivers conforming with any of a variety of different form factors, examples of which include, but are not limited to, XFP, SFP, SFP+ and SFF, as well as a variety of different communication protocols, examples of which include, but are not limited to, GiGE, SONET, and Fibre Channel.

With continuing reference to FIG. 2, and with reference as well to FIG. 1, transceiver 100 includes printed circuit board ("PCB") 50 on which the various electronic components of the transceiver are mounted. One such component is a control module 105. Control module 105 is connected to an integrated post-amplifier/laser driver ("PA/LD") 102 by connections 105A and 105B. These connections allow control module 105 to monitor the operation of the post-amplifier/laser driver 102 as will be described in more detail to follow. Control module 105 is connected to a persistent memory 106, which stores microcode for configuring control module 105 and is also used to store operational parameters. The control module 105 is also able to communicate with an external host 111 as depicted by the Serial Data line (SDA) and Serial Clock line (SCL).

Transceiver 100 includes both a transmit path and a receive path, both of which will now be described. The receive path includes ROSA 10, which transforms an incoming optical data signal into an electrical data signal. The electrical data signal is then provided to a post-amplifier portion of PA/LD 102. The post-amplifier amplifies and otherwise processes the electrical data signal and provides the electrical data signal to the external host 111 via connection 102A.

For the transmit path, external host 111 generates an electrical data signal and provides the electrical data signal to a laser driver portion of PA/LD 102 via connection 102B. The laser driver processes the electrical data signal and drives the TOSA 20, which causes the TOSA 20 to emit an optical data signal.

The operation of transceiver 100 will now be described in further detail. In operation, the optical transceiver 100, receives an optical data signal from a fiber 110A via the ROSA 10 in manner to be described more fully below. The ROSA 10 transforms the received optical data signal into an electrical data signal. The ROSA 10 then provides the resulting electrical data signal to a post-amplifier. In the illustrated embodiment, the post amplifier is consolidated with the laser driver as an integrated PA/LD 102. As such, the PA/LD 102 resides on a single integrated circuit chip and is included as a component, together with the other electronic components 40, some of which are further described below, on PCB 50. In other embodiments, the post amplifier and laser driver are implemented as separate components on the PCB 50.

The post-amplifier portion of the PA/LD 102 amplifies the received electrical data signal and provides the amplified data signal to external host 111 over signal path 102A. The external host 111 may be any computing system capable of communicating with the optical transceiver 100. The external host 111 contains a host memory 112 that may be any volatile or non-volatile memory source. In one embodiment, some components of the optical transceiver 100 can reside on the host 111 while the other components of the transceiver reside on the PCB 50 separate from the host 111.

The optical transceiver 100 may also receive electrical data signals from the host 111 for transmission onto a fiber 110B. Specifically, the laser driver portion of the PA/LD 102 receives the electrical data signal from the host 111 via the signal path 102B, and drives a light source within the TOSA 20. One example of a light source is a DML that causes the TOSA 20 to emit onto the fiber 110B optical data signals representative of the information in the electrical data signal provided by the host 111.

The behavior of the ROSA 10, the PA/LD 102, and the TOSA 20 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, age of the laser, and/or operating conditions, such as voltage, and receive information from the post-amplifier portion of the PA/LD 102 by way of connection 105A, and from the laser driver portion of the PA/LD by way of connection 105B. This arrangement allows the control module 105 to optimize the performance of the laser to compensate for dynamically varying conditions.

Specifically, the control module 105 optimizes the operation of the transceiver 100 by adjusting settings on the PA/LD 102 as represented by the connections 105A and 105B. These settings adjustments can be intermittent and are generally only made when temperature or voltage or other low frequency changes so warrant.

The control module 105 has access to a persistent memory 106, which in one embodiment, is an Electrically Erasable and Programmable Read Only Memory (EEPROM). Persistent memory 106 may also be any other non-volatile memory source. Persistent memory 106 is used to store microcode for configuring control module 105 and for storing operational parameters that have been measured by the control module 105. The persistent memory 106 and the control module 105 may be packaged together in the same package or in different packages without restriction.

Data and clock signals may be provided from the host 111 to the control module 105 using the SDA and SCL lines respectively. Also data may be provided from the control module 105 to the host 111 to allow for transmitting diagnostic data such as environmental and/or operational parameters. The control module 105 includes both an analog portion 108 and a digital portion 109. In this example, the analog portion 108 and the digital portion 109 collectively enable the control module to implement logic digitally, while still largely interfacing with the rest of the optical transceiver 100 using analog signals.

II. Example Embodiment of a Post-Amplifier

Figure 3:
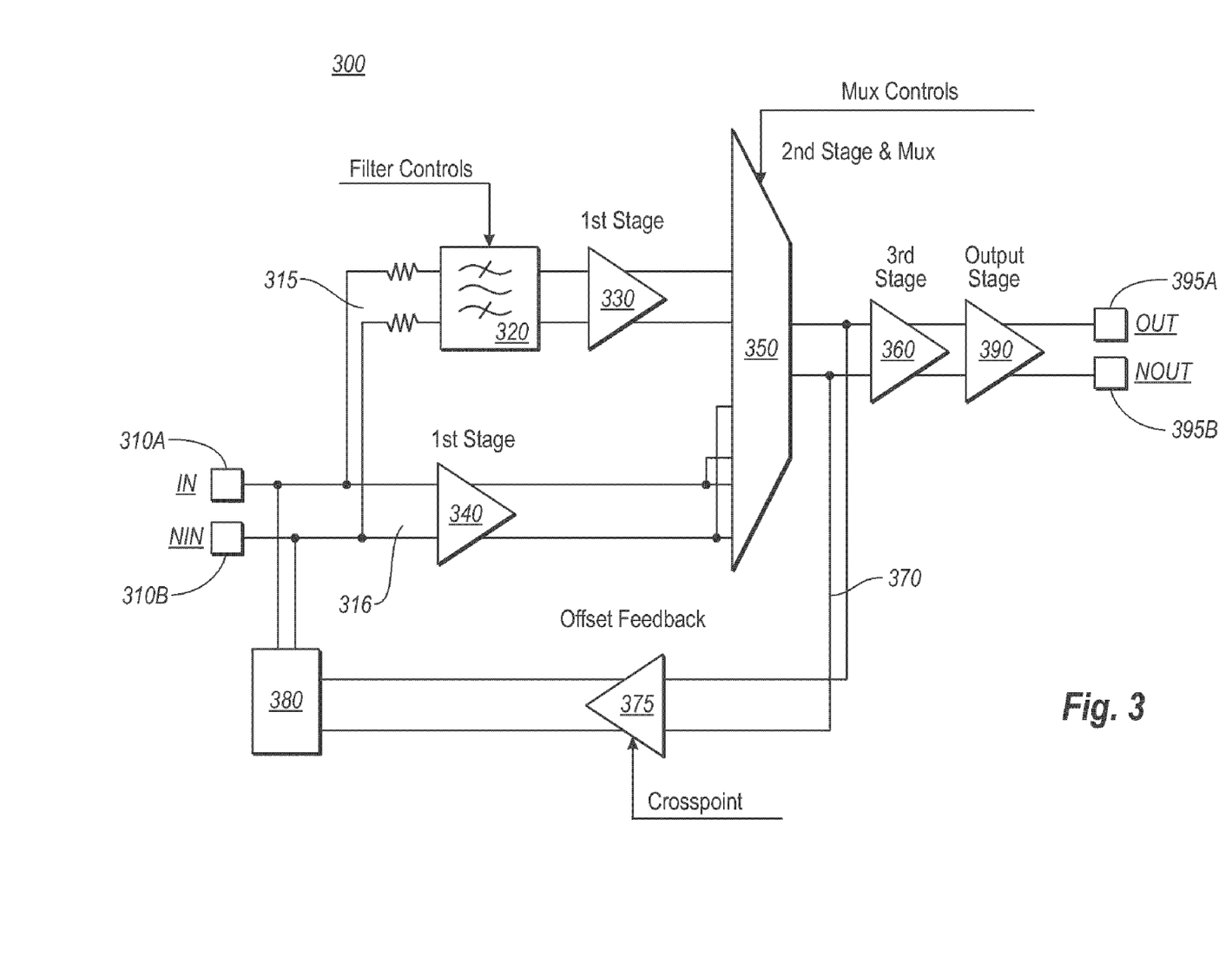
FIG. 3 is a block diagram of an example post-amplifier module of the transceiver of FIG. 2.

Referring now to FIG. 3, a block diagram of an example post-amplifier 300 is shown. The post amplifier 300 may correspond to the post amplifier portion of LD/PA 102 of FIGS. 1 and 2, although this is not required. Note that the following description is for illustration only and should not be used to limit the scope of the appended claims or the embodiments disclosed herein.

Post-amplifier 300 includes a differential input 310A and 310B. The differential input may receive a differential signal from a receiver stage such as ROSA 10 of FIGS. 1 and 2. Specifically, input node 310A receives the positive signal portion and input node 310B receives a complimentary signal portion. As mentioned above, the differential signal received at nodes 310A and 310B may be 1 Gbit/s, 2 Gbit/s, 4 Gbit/s, 10 Gbit/s, as well as even higher data rates. Note that although FIG. 3 and its accompanying description depict the received signal as being differential, the embodiments disclosed herein also apply to a singled ended system.

Post-amplifier 300 further includes a low speed path 315 and a high speed path 316. 1 Gbit/s, 2 Gbit/s, 4 Gbit/s signals are propagated on the low speed path 315 to a filter 320. Filter 320 performs rate selection on the signal. For example, control signals are received that indicate whether a 1 Gbit/s, 2 Gbit/s, or 4 Gbit/s signal should be passed. Any non-selected signals are filtered out.

The filter 320 then provides the selected signal to a low speed path first gain stage 330. The first gain stage 330, which may be comprised of any reasonable components, amplifies the signal. In one embodiment, gain stage 330 is configured to provide 30 dB of gain to the signal.

In like manner, any 10 Gbit/s or higher signals are propagated on the high speed path 316 to a high speed path first gain stage 340, where the signal is amplified. In one embodiment, the gain stage 340, which may also be comprised of any reasonable components, is configured to provide a gain equivalent to the amount provided by gain stage 330.

A second gain stage and multiplexer 350 is then used to select a desired signal and to add additional gain to the signal. For example, second gain stage and multiplexer 350 receives control signals that specify whether to select a signal from low speed path 315 or from high speed path 316. The selected signal is then amplified by second gain stage and multiplexer 350. In one embodiment, second gain stage and multiplexer 350, which may be comprised of any reasonable components, is configured to provide 14 dB of gain to the signal.

Post-amplifier 300 further includes a third gain stage 360. As with the gain stages previously discussed, third gain stage 360 may be implemented with any reasonable components. The third gain stage 360 receives the signal from second gain stage 350 and amplifies the signal. In some embodiments, third gain stage is configured to provide 3 dB of gain to the signal.

The signal is then passed to output stage 390. The differential signal is then provided to output nodes 395A and 395B, where it may be propagated to other components of the optical transceiver 100.

In some embodiments, post-amplifier 300 may include a feedback loop 370. In such embodiments, the signal output from the second gain stage 350 is propagated through the feedback loop 370. The signal passes through gain stage 375, which may be comprised of any reasonable components, where amplification takes place. In some embodiments, cross-point adjustment may occur in gain stage 375. The signal also passes through an offset cancel module 380 that is configured to provide offset cancellation.

Having described an exemplary environment with respect to FIGS. 1, 2 and 3, it will be understood that such environment is only one of countless architectures in which the embodiments described herein may be employed. As previously stated, the embodiments described herein are not intended to be limited to implementation in any particular environment.

Figure 4:
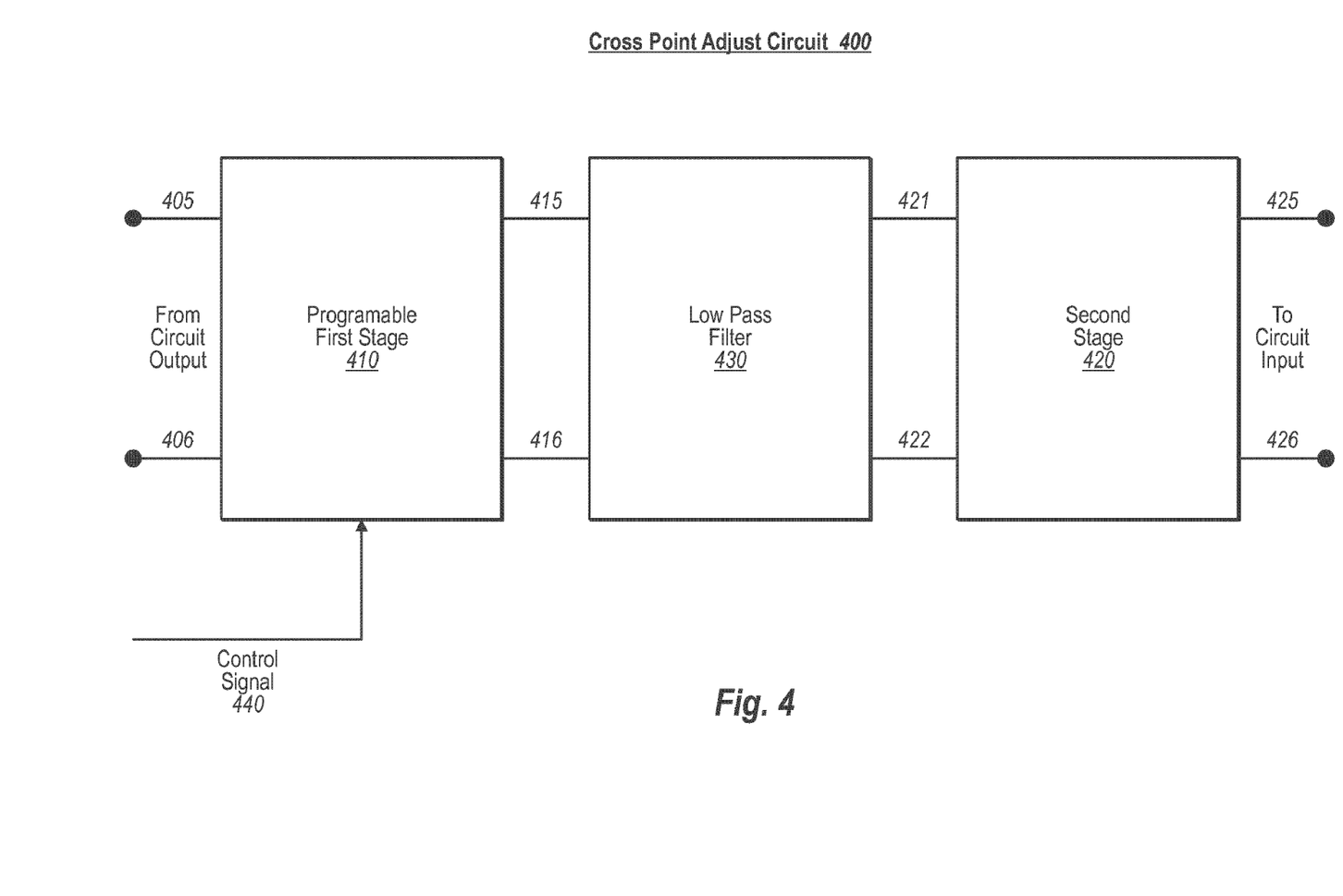
FIG. 4 is a block diagram of a cross-point adjustment circuit.

III. Example Embodiments of a Circuit Configured to Provide Cross-Point Adjustment FIG. 4 illustrates an example cross-point adjustment circuit or stage 400. Cross-point adjustment circuit 400 may correspond to the feedback loop 370 previously described in relation to FIG. 3, although this is not required. Note that although various components are illustrated as comprising circuit 400, it should be understood that this is for illustration only. The embodiments disclosed herein contemplate a circuit 400 with additional components not illustrated in FIG. 4. Also note that the reference to a first, second, third, etc. component (such as a transistor) in this description and in the claims is not intended to imply any sequential listing and is merely intended to distinguish one component from another.

Cross-point adjustment circuit 400 may include a programmable first stage 410 that may be coupled to an output stage or other stage of post-amplifier 300. For example, as illustrated in FIG. 3, programmable first stage 410, which may correspond to amplifier 375, may be coupled to the output of second stage 350 and the input of third stage 360. Of course other configurations are also contemplated by the embodiments disclosed herein.

As illustrated, programmable first stage 410 includes a first input node 405 for receiving a first data signal and an input node 406 that is configured to receive a second data signal that is complementary to the first data signal. Note that in some embodiments, programmable first stage 410 may receive a single ended signal.

In operation, programmable first stage 410 is configured to adjust a cross-point up or down as desired by altering the amount of current in the first data signal and/or the second data signal before providing those signals to the other components of circuit 400. The current adjustment thus creates an offset or difference between the data signals. As mentioned previously, it is often desirable to adjust the cross-point from its normal setting of typically at 0.5 volts to a different setting to compensate for noise and other potential signal impurities. Programmable first stage 410 may be programmed by a user to adjust to a desired cross-point as will be described in more detail to follow. For example, a control signal 440 may be received from control module 105 or some other source that directs programmable first stage 410 to adjust the current a desired amount. Note that programmable first stage 410 may be configured to receive the control signal 440 by any reasonable electrical interface.

Programmable first stage 410 further includes an output node 415 for providing the first data signal to an input node 421 of a second stage 420. In addition, an output node 416 of first stage 410 provides the complimentary data signal to an input node 422 of second stage 420. Note that in some embodiments, second stage 420 may receive a single ended signal from programmable first stage 410.

In operation, second stage 420 receives the first data signal and the complementary data signal from the programmable first stage 410. As mentioned, the amount of current in either of the data signals may have been adjusted by programmable first stage 410 to create a difference or offset. Second stage 420 is configured to supply the offset, if any, to the input of post-amplifier 300 via output terminals 425 and 426. The supplied offset then creates a voltage difference at the input of the post-amplifier 300 which causes the cross-point at the output of the post-amplifier to adjust up or down as will be explained in more detail to follow.

In some embodiments, a low pass filter 430 may be placed between programmable first stage 410 and second stage 420. Filter 430 is typically configured to disregard high frequency data signals, while filtering lower frequency signals that may interfere with the cross-point adjustment. In this manner, unwanted signals typically are not allowed to interfere with the cross-point adjustment. Note that in some embodiments, low pass filter 430 may be comprised of two or more filter stages, one of which may be located in the programmable first stage or the second stage.

Figure 5:
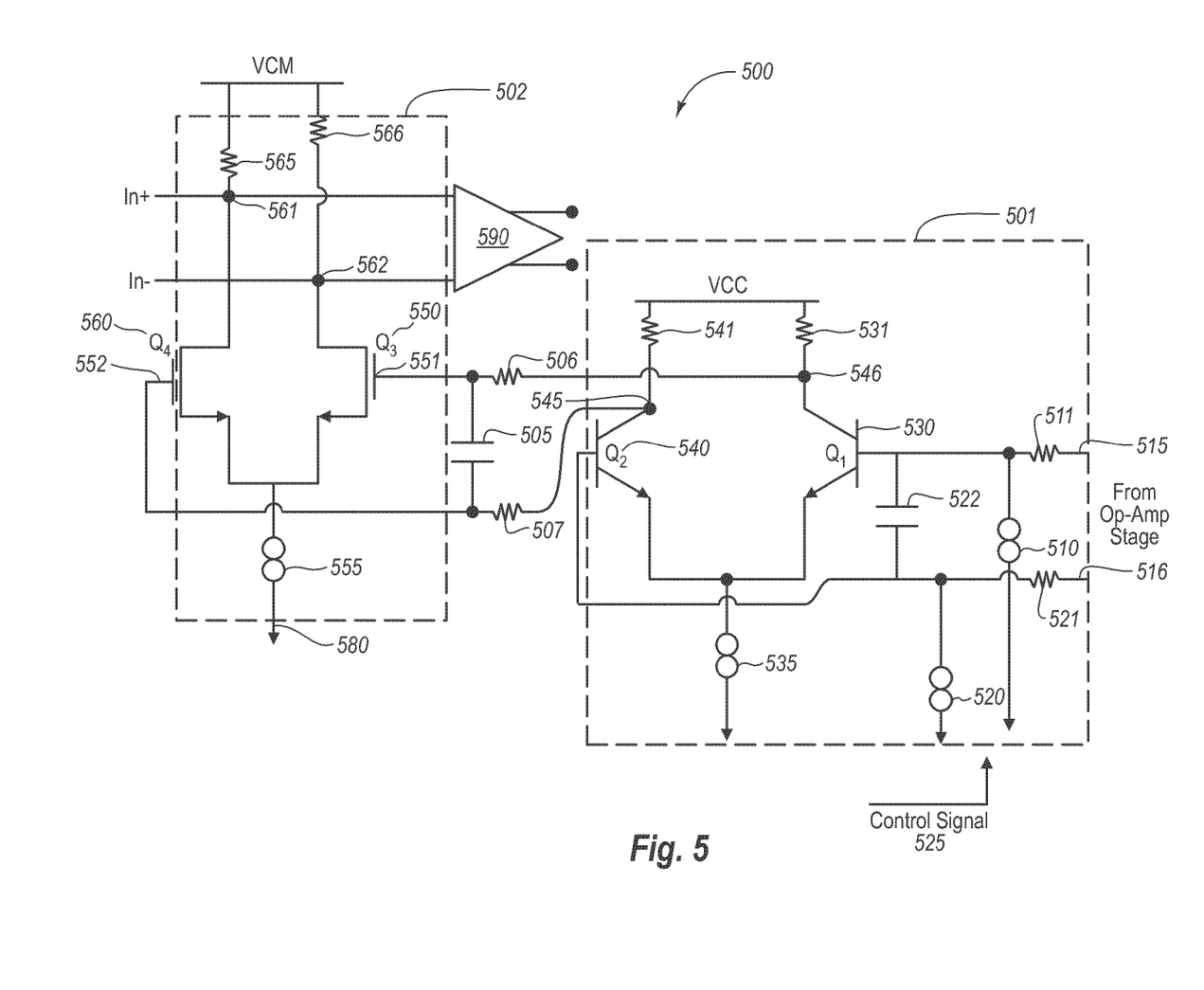
FIG. 5 is a specific embodiment of the cross-point adjustment circuit of FIG. 4.

Referring now to FIG. 5, a specific embodiment of a cross-point adjustment circuit or stage 500 is illustrated. Note that although various components are illustrated as comprising circuit 500, it should be understood that this is for illustration only. The embodiments disclosed herein contemplate a circuit 500 with additional components not illustrated in FIG. 5.

The cross-point adjustment circuit 500 includes a first stage 501 that may correspond to programmable first stage 410 of FIG. 4, although this is not required. Cross-point adjustment circuit 500 also includes a second stage 502 that may correspond to the second stage 420 of FIG. 4. A capacitor 505 is also included and may correspond to low pass filter 430 of FIG. 4.

The first stage have 501 includes an input node 515 for receiving a first data signal and an input node 516 that is configured to receive a second data signal that is complementary to the first data signal. The input nodes 515 and 516 may be coupled to another component of post-amplifier as explained previously.

Coupled to the input node 515 through a resistor 511 is a programmable current supply 510. Specifically, a first node of resistor 511 is coupled to input node 515 and a second node is coupled to the programmable current supply 510.

Similarly, a programmable current supply 520 is coupled to input node 516 through a resistor 521. Specifically, a first node of resistor 521 is coupled to input node 516 and a second node is coupled to programmable current supply 520. Programmable current supplies 510 and 520 are configured to at least partially create a voltage difference between nodes 515 and 516 as will be explained in more detail to follow. The programmable current supplies are further configured to receive a control signal 525 from control module 105 or some other processing source that specifies how much current adjustment is needed by any reasonable electrical interface.

The first data signal is provided to a first bipolar transistor 530 (also labeled as Q1). Specifically, a base terminal of bipolar transistor 530 is coupled to the input node 515 and the second node of resistor 511 and the programmable current supply 510. A collector terminal of transistor 530 is coupled to the first node of a series resistor 531, which is configured to have a second node be coupled to a voltage source VCC. An emitter of bipolar transistor 530 is coupled to a current source 535.

In like manner, the second data signal is provided to a second bipolar transistor 540 (also labeled as Q2). Specifically, a base terminal of bipolar transistor 540 is coupled to the second node of resistor 521 and the programmable current source 520. A collector terminal of bipolar transistor 540 is coupled to the first node of a series resistor 541, which is configured to have a second node be coupled to the voltage source VCC. An emitter of bipolar transistor 540 is also coupled to a voltage source or ground 583. As illustrated in FIG. 5, transistors Q1 and Q2 form a bipolar transistor differential pair.

In some embodiments, cross-point adjustment circuit 500 may also include a capacitor 522 having a first node coupled to the base of transistor 530 and a second node coupled to the base of transistor 540. Capacitor 522 is configured to rectify high frequency signals and may be a stage of low pass filter 430.

As mentioned previously, circuit or stage 500 also includes a second stage 502. The second stage 502 includes a first field effect transistor (FET) 550 (also labeled as Q3). A gate terminal of FET transistor 550, labeled as node 551, is coupled to the collector of first bipolar transistor 530, which is labeled as node 546. A drain terminal of FET transistor 550 is coupled to a second amplifier input node 562 and the first terminal of a series resistor 566, whose second terminal is coupled to a voltage source VCM. Finally, a source terminal of FET transistor 550 is coupled to a current source 555, which is in turn coupled to a common reference 580. In some embodiments, the series resistor 566 may be a 50 ohm termination resistor, although this is not required.

The second stage 502 includes a second FET transistor 560 (also labeled as Q4). A gate terminal of FET transistor 560, labeled as node 552, is coupled to the collector of second bipolar transistor 540, which is labeled as node 545. A drain terminal of FET transistor 560 is coupled to a first amplifier input node 561 and the first terminal of a series resistor 565, whose second terminal is coupled to the voltage source VCM. Finally, a source terminal of FET transistor 560 is coupled to the current source 555, which is in turn coupled to a voltage source or ground 584. In some embodiments, the series resistor 565 may be a 50 ohm termination resistor, although this is not required. As illustrated in FIG. 5, transistors Q3 and Q4 form a FET transistor differential pair.

As mentioned, the first amplifier input node 561 is coupled to the drain of FET transistor 560 and the second amplifier input node 562 is coupled to the drain of FET transistor 550. The first amplifier input node 561 and the second amplifier input node 562 are configured for receiving a first amplifier input data signal and a second amplifier input data signal that is complementary to the first data signal. The amplifier input nodes 561 and 562 may be coupled to another component of transceiver 100 such as a trans-impendence amplifier of ROSA 10. As circuit 500 is a feed-back loop circuit, the amplifier input nodes 561 and 562 also receive the first and second feed-back signals from the FET transistors 550 and 560.

As illustrated, some embodiments of cross-point adjustment circuit 500 also include a capacitor 505 that has a first terminal coupled between nodes 546 and 551 and a second terminal coupled between nodes 545 and 552. The first terminal of capacitor 505 is also coupled to a first terminal of a resistor 506, whose second terminal is coupled to node 546. The second terminal of capacitor 505 is coupled to a first terminal of a resistor 507, whose second terminal is coupled to node 545. Capacitor 505, along with resistors 506 and 507, is configured to act as a low pass filter that disregards high speed data signals and filters out unwanted fast speed signals that may interfere with the cross-point adjustment process.

Also illustrated in FIG. 5 is an amplifier stage 590 that is coupled to first and second amplifier input nodes 561 and 562. Note that amplifier stage 590 is not part of cross-point adjustment circuit 500 and is merely included to illustrate that the feed-back signal provided to the input nodes from circuit 500 is then provided to other amplifier stages of post-amplifier 300.

Figure 6:
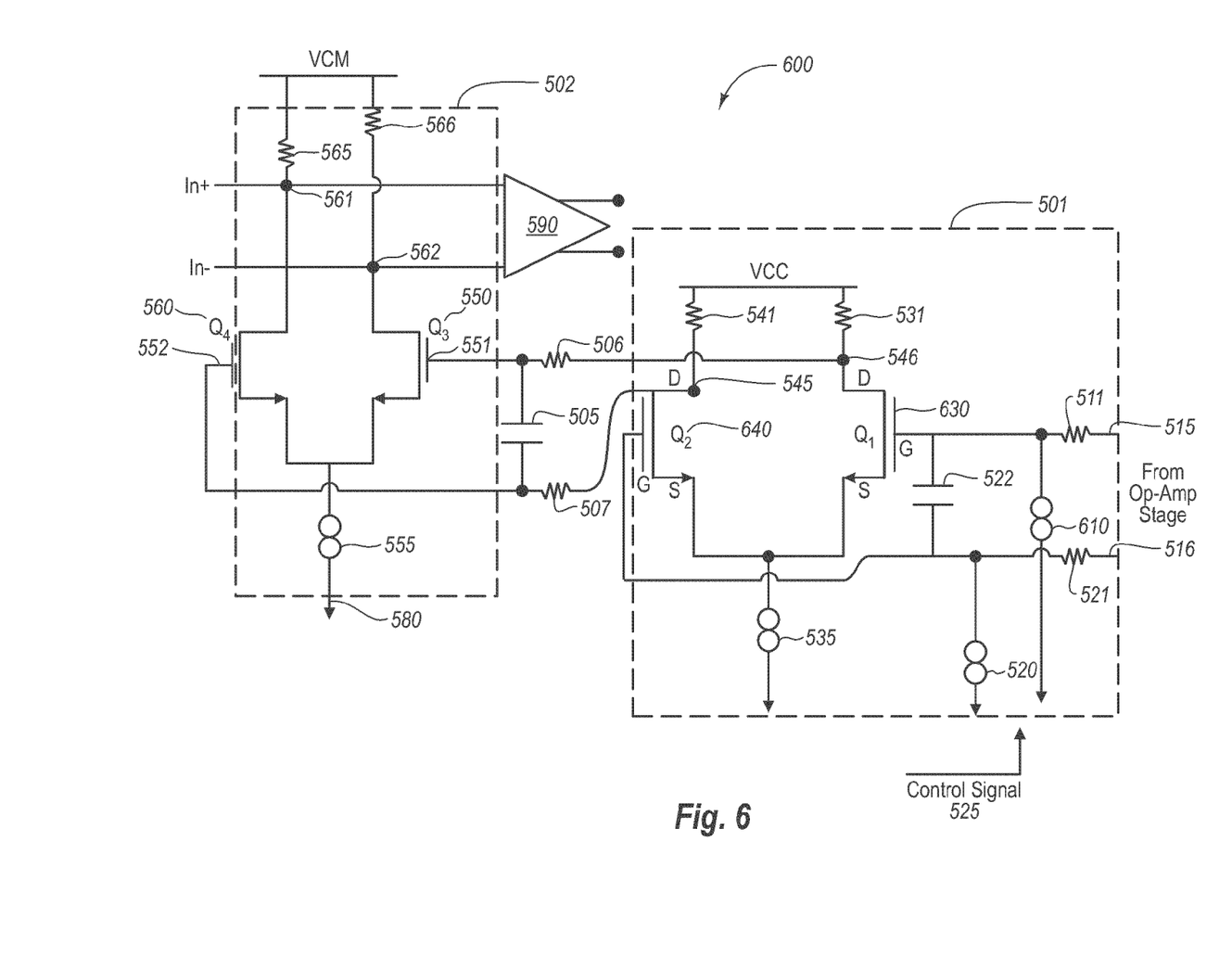
FIG. 6 is an alternative embodiment of the cross-point adjustment circuit of FIG. 4.

FIG. 6 illustrates an alternative embodiment of first stage 501. In the alternative embodiment, a FET transistor 630 (also labeled as Q1) has a gate terminal coupled the second terminal of resistor 511 and the programmable current source 510. A drain terminal of transistor 630 is coupled to the first terminal of resistor 531, while the source terminal of transistor 630 is coupled to the current source 535.

In like manner, a FET transistor 640 (also labeled as Q2) has a gate terminal coupled the second terminal of resistor 521 and the programmable current source 520. A drain terminal of transistor 640 is coupled to the first terminal of resistor 541, while the source terminal of transistor 640 is coupled to the current source 535. As illustrated in FIG. 6, transistors Q1 and Q2 form a FET transistor differential pair. Note that in those embodiments including capacitor 522, the capacitor 522 is coupled to the gate terminals of transistors 630 and 640 as illustrated.

IV. Operation of the Cross-Point Adjustment Circuit

As previously mentioned, it often desirable to adjust the location of the cross-point of an eye diagram of the post-amplifier output signal in order to compensate for signal noise and other signal impurities. For example, suppose that a 1 volt signal had 100 mV of noise on the low or 0 signal level and 400 mV of noise on the high or 1 signal level. If the cross-point were kept in the middle (i.e., 0.5V) as is typical, then the post-amplifier may incorrectly determine that a received signal of 0.49 volts, which should be determined to be a logical 0, is a logical 1 because the added noise. In other words, keeping the cross-point in the middle may cause the post-amplifier to make incorrect determinations of whether a received signal is a logical 0 or logical 1. Advantageously, the feed-back circuit or amplifier stage of the present invention allows for cross-point adjustment, which in turn helps to maximize the bit rate error (BER) of the signal. For example, the cross-point may be adjusted to 0.4 volts or 0.7 volts or other desired levels to compensate for the added noise and other signal impurities and to help maximize the BER of the signal.

In operation, a differential signal is provided to nodes 515 and 516 from another stage of post-amplifier 300, such as second stage 350 or third stage 360. This differential signal may have an offset that was measured at the output due to noise and the like as previously discussed. Based on this offset, the provided differential signal may then be adjusted by programmable current sources 510 and 520 to a desired level to compensate for the signal impurities. For example, a control signal 525 from control module 105 or some other source may direct the programmable current supplies 510 and/or 520 to adjust the amount of current across the resistors 511 and 521 respectively. Adjusting the current across one or both of these resistors causes a voltage difference between nodes 515 and 516. In addition, filtering by capacitor 522 may occur as previously described.

The differential signal is then amplified by transistors Q1 and Q2. Note that a voltage difference or offset is created at nodes 545 and 546. The amount of voltage at each node is determined by multiplying the current at nodes 546 and 545 with the values of resistors 531 and 541 respectively. The difference in this voltage is the offset.

The differential signal is then provided to the FET differential pair 550 and 560. As mentioned, the filter capacitor 505 may perform filtering as previously described on the signal to remove any unwanted fast moving signal components.

The FET differential pair acts as an output stage that controls how the offset created by adjusting the programmable current sources is provided to amplifier input nodes 561 and 562. For example, if no offset were provided by transistors 530 and 540, then transistors 550 and 560 would provide an equal amount of current to the amplifier input nodes. For instance, suppose current source 555 was configured to provide 100 µA to transistors 550 and 560. In such a case, each transistor would provide 50 micro-amps to the amplifier input nodes 561 and 562.

When an offset is provided by transistors 530 and 540, the transistors 550 and 560 control how the current supplied by current source 555 is provided to the amplifier input nodes 561 and 562. For example, suppose that current source 555 was again configured to 100 µA. The offset introduced by transistors 530 and 540 may cause that 75 µA flows through transistor 560 and 25 µA flows through transistor 550. The total current through both the FET transistors is still 100 µA total, but the offset causes the current difference.

This current difference is then provided to amplifier input nodes 561 and 562, where a voltage difference is created. The voltage difference or offset is then provided to amplifier stage 590 of other stages of post-amplifier 300. This new difference or offset then causes the cross-point of the output eye diagram to adjust up or down, depending on the offset introduced at amplifier input nodes 561 and 562. This process may be repeated as needed until the cross-point is at an optimum level.

Continuing the above example, if 75 µA were provided to amplifier input node 561, then the voltage at the node would equal this value multiplied by 50 ohm resistor 565, which is 3.75 mV. In similar fashion, if 25 µA were provided to amplifier input node 562, then the voltage at the node would be this value multiplied by 50 ohm resistor 566, which is 1.25 mV. The overall voltage difference or offset is 2.5 mV. As mentioned above, this difference or offset is then applied to the differential signal at amplifier nodes 561 and 562, which in turn causes the cross-point of the output eye to adjust up or down.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A circuit for providing cross-point adjustment comprising:
    a first input node configured to receive a first data signal;
    a second input node configured to receive a second data signal that is the complementary of the first data signal;
    a programmable first stage having a first node coupled to the first input node and a second node coupled to the second input node, wherein the programmable first stage is configured to adjust an amount of current provided to the first or second data signals to thereby create a signal offset, wherein the programmable first stage comprises:
    a first programmable current supply;
    a second programmable current supply;
    a first resistor having a first node coupled to the first input node and a second node coupled to the first programmable current supply;
    a second resistor having a first node coupled to the second input node and a second node coupled to the second programmable current supply;
    a first bipolar transistor having a base terminal coupled to the second node of the first resistor and having an emitter terminal coupled to a first current source;
    a second bipolar transistor having a base terminal coupled to the second node of the second resistor and having an emitter terminal coupled to the first current source;
    a third resistor having a first terminal coupled to a collector terminal of the first bipolar transistor pair and having a second terminal configured to be coupled to a voltage source when in operation;
    a fourth resistor having a first terminal coupled to a collector terminal of the second bipolar transistor and having a second terminal configured to be coupled to the voltage source when in operation;
        wherein the collector terminals of the first and second bipolar transistors act as output nodes; and
    a second stage having a first node coupled to a third node of the programmable first stage and a second node coupled to a fourth node of the programmable first stage, wherein the second stage is configured to provide the signal offset at a third and fourth node of the second stage to thereby adjust the cross-point of the first and second signals,
    wherein the first and second input nodes of the cross-point adjustment circuit are coupled to receive the first and second data signals from an amplifying stage of a post-amplifier in a receiver;
    wherein the third and fourth nodes of the second stage are coupled to adjust the cross-point at an input stage of the post-amplifier; and
    wherein the first and second programmable current supplies are configured to receive a control signal from a control module specifying the amount of current to adjust, wherein adjusting the first or second programmable current supply causes a signal offset at the collector terminal of the first and second bipolar transistors.

2. The circuit in accordance with claim 1 further comprising a low pass filter having a first node coupled between the third node of the programmable first stage and the first node of the second stage and having a second node coupled between the fourth node of the programmable first stage and the second node of the second stage.

3. The circuit in accordance with claim 2, wherein the low pass filter comprises at least a capacitor configured to filter fast moving signal components.

4. The circuit in accordance with claim 1, wherein the programmable first stage includes one or more programmable current supplies configurable to adjust the current provided to the first or second data signals.

5. The circuit in accordance with claim 1, wherein the programmable first stage is configured to receive a control signal from a control module specifying the amount of current to adjust.

6. The circuit in accordance with claim 1, further including a rectifying capacitor having a first terminal coupled to the base of the first bipolar transistor and having a second terminal coupled to the base of the second bipolar transistor.

7. The circuit in accordance with claim 1, wherein the second stage comprises:
    an first input node;
    a second input node;
    a first field effect transistor (VET) having a gate terminal coupled to the first input node and having a source terminal coupled to a current supply;
    a second FET transistor having a gate terminal coupled to the second input node and having a source terminal coupled to the current supply;
    a first resistor having a first terminal coupled to a drain terminal of the first FET transistor and having a second terminal configured to be coupled to a voltage source when in operation; and
    a second resistor having a first terminal coupled to the drain terminal of the second FET transistor and having a second terminal configured to be coupled to the voltage source when in operation.

8. The circuit in accordance with claim 7, wherein the offset is provided at the drain terminal of the first and second VET transistors.

9. The circuit in accordance with claim 7, wherein the first and second resistors are 50 ohm termination resistors.

10. A circuit for providing cross-point adjustment comprising:
    a first input node configured to receive a first data signal;
    a second input node configured to receive a second data signal that is the complementary of the first data signal;
    a programmable first stage having a first node coupled to the first input node and a second node coupled to the second input node, wherein the programmable first stage is configured to adjust an amount of current provided to the first or second data signals to thereby create a signal offset, wherein the programmable first stage comprises:
a first programmable current supply;
a second programmable current supply;
a first resistor having a first node coupled to the first input node and a second node coupled to the first programmable current supply;
a second resistor having a first node coupled to the second input node and a second node coupled to the second programmable current supply;
a first VET transistor having a gate terminal coupled to the second node of the first resistor and having an source terminal coupled to a first current source;
a second FET transistor having a gate terminal coupled to the second node of the second resistor and having an source terminal coupled to the first current source;
a third resistor having a first terminal coupled to a drain terminal of the first FET transistor pair and having a second terminal configured to be coupled to a voltage source when in operation;
a fourth resistor having a first terminal coupled to a drain terminal of the second FET transistor and having a second terminal configured to be coupled to the voltage source when in operation;
wherein the drain terminals of the first and second FET transistors act as output nodes;
a second stage having a first node coupled to a third node of the programmable first stage and a second node coupled to a fourth node of the programmable first stage, wherein the second stage is configured to provide the signal offset at a third and fourth node of the second stage to thereby adjust the cross-point of the first and second signals,
wherein the first and second input nodes of the cross-point adjustment circuit are coupled to receive the first and second data signals from an amplifying stage of a post-amplifier in a receiver,
wherein the third and fourth nodes of the second stage are coupled to adjust the cross-point at an input stage of the post-amplifier, and
wherein the first and second programmable current supplies are configured to receive a control signal from a control module specifying the amount of current to adjust, wherein adjusting the first or second programmable current supply causes a signal offset at the drain terminal of the first and second FET transistors.

11. The circuit in accordance with claim 10, further including a rectifying capacitor having a first terminal coupled to the gate of the first FET transistor and having a second terminal coupled to the gate of the second FET transistor.

12. A circuit for providing cross-point adjustment comprising:
an first input node;
a second input node;
a first programmable current supply;
a second programmable current supply;
a first resistor having a first node coupled to the first input node and a second node coupled to the first programmable current supply;
a second resistor having a first node coupled to the second input node and a second node coupled to the second programmable current supply;
a first bipolar transistor having a base terminal coupled to the second node of the first resistor and having an emitter terminal coupled to a first current source;
a second bipolar transistor having a base terminal coupled to the second node of the second resistor and having an emitter terminal coupled to the first current source;
a third resistor having a first terminal coupled to a collector terminal of the first bipolar transistor pair and having a second terminal configured to be coupled to a voltage source when in operation;
a fourth resistor having a first terminal coupled to a collector terminal of the second bipolar transistor and having a second terminal configured to be coupled to the voltage source when in operation;
a first field effect transistor (VET) having a gate terminal coupled to the collector of the first bipolar transistor and having a source terminal coupled to a second current supply;
a second FET transistor having a gate terminal coupled to the collector terminal of the second bipolar transistor and having a source terminal coupled to the second current supply;
a fifth resistor having a first terminal coupled to a drain terminal of the first FET transistor and having a second terminal configured to be coupled to a second voltage source when in operation; and
a sixth resistor having a first terminal coupled to the drain terminal of the second FET transistor and having a second terminal configured to be coupled to the second voltage source when in operation,
wherein the first and second programmable current supplies are configured to receive a control signal from a control module specifying the amount of current to adjust, wherein adjusting the first or second programmable current supply causes a signal offset at the collector terminal of the first and second bipolar transistors.

13. The circuit in accordance with claim 12 further comprising:
a seventh resistor having a first terminal coupled to the collector of the first bipolar transistor;
an eighth resistor having a first terminal coupled to the collector of the first bipolar transistor; and
a capacitor having a first terminal coupled to a second terminal of the first resistor and the gate terminal of the first FET transistor and having a second terminal coupled to a second terminal of the second resistor and the gate terminal of the second FET transistor, wherein the seventh and eighth resistors and the capacitor act as a low pass filter when in operation.

14. The circuit in accordance with claim 12, wherein the drain terminal of the first FET transistor is further coupled to a first input node of a post-amplifier and the drain terminal of the second FET transistor is coupled to a second input node of the post-amplifier.

15. The circuit in accordance with claim 12 wherein the signal offset is provided at the drain terminal of the first and second VET transistors to a first and second post-amplifier nodes coupled to the drain terminals of the first and second FET transistors respectively, wherein providing the offset at the drain terminals adjusts the cross-point of an output signal of the post-amplifier.

16. A circuit for providing cross-point adjustment comprising:
an first input node;
a second input node;
a first programmable current supply;
a second programmable current supply;
a first resistor having a first node coupled to the first input node and a second node coupled to the first programmable current supply;

a second resistor having a first node coupled to the second input node and a second node coupled to the second programmable current supply;

a first field effect transistor (VET) transistor having a gate terminal coupled to the second node of the first resistor and having an source terminal coupled to a first current source;

a second FET transistor having a gate terminal coupled to the second node of the second resistor and having an source terminal coupled to the first current source;

a third resistor having a first terminal coupled to a drain terminal of the first FET transistor pair and having a second terminal configured to be coupled to a first voltage source when in operation;

a fourth resistor having a first terminal coupled to a drain terminal of the second FET transistor and having a second terminal configured to be coupled to the first voltage source when in operation;

a third FET having a gate terminal coupled to the drain of the first FET transistor and having a source terminal coupled to a second current supply;

a fourth FET transistor having a gate terminal coupled to the drain terminal of the second FET transistor and having a source terminal coupled to the second current supply;

a fifth resistor having a first terminal coupled to a drain terminal of the third FET transistor and having a second terminal configured to be coupled to a second voltage source when in operation; and a sixth resistor having a first terminal coupled to the drain terminal of the fourth FET transistor and having a second terminal configured to be coupled to the second voltage source when in operation, wherein the first and second programmable current supplies are configured to receive a control signal from a control module specifying the amount of current to adjust, wherein adjusting the first or second programmable current supply causes a signal offset at the drain terminal of the first and second VET transistors.

17. The circuit in accordance with claim 16 further comprising:

a seventh resistor having a first terminal coupled to the drain of the first FET transistor;

an eighth resistor having a first terminal coupled to the drain of the first FET transistor and a capacitor having a first terminal coupled to a second terminal of the first resistor and the gate terminal of the first FET transistor and having a second terminal coupled to a second terminal of the second resistor and the gate terminal of the second FET transistor, wherein the seventh and eighth resistors and the capacitor act as a low pass filter when in operation.

18. The circuit in accordance with claim 16, wherein the drain terminal of the third FET transistor is further coupled to a first input node of a post-amplifier and the drain terminal of the fourth FET transistor is coupled to a second input node of the post-amplifier.

19. The circuit in accordance with claim 16, wherein the signal offset is provided at the drain terminal of the third and fourth FET transistors to a first and second post-amplifier nodes coupled to the drain terminals of the third and fourth FET transistors respectively, wherein providing the offset at the drain terminals adjusts the cross-point of an output signal of the post-amplifier.

* * * * *